United States Patent
Zhang et al.

(10) Patent No.: US 11,281,243 B2
(45) Date of Patent: Mar. 22, 2022

(54) SAFETY DEVICE FOR HYDRODYNAMIC PRESSURE REGULATING PIPE NETWORK

(71) Applicant: Shandong Keyuan Water Supply And Drainage Equipment Engineering Co. Ltd., Dezhou (CN)

(72) Inventors: Yonghua Zhang, Dezhou (CN); Huiming Zhang, Dezhou (CN); Qinghong Yan, Dezhou (CN); Hongbo Wang, Dezhou (CN); Mei Li, Dezhou (CN); Lianyong Wang, Dezhou (CN); Jiandong Gao, Dezhou (CN); Chunfang Xu, Dezhou (CN); Qingbo Song, Dezhou (CN)

(73) Assignee: Shandong Keyuan Water Supply and Drainage Equipment Engineering Co., Ltd., Dezhou (CN)

( * ) Notice: Subject to any disclaimer, the term of this patent is extended or adjusted under 35 U.S.C. 154(b) by 26 days.

(21) Appl. No.: 16/920,310

(22) Filed: Jul. 2, 2020

(65) Prior Publication Data
US 2021/0341955 A1 Nov. 4, 2021

(30) Foreign Application Priority Data
Apr. 30, 2020 (CN) .......................... 202010361386.4

(51) Int. Cl.
*F16K 31/122* (2006.01)
*G05D 16/20* (2006.01)
*F16K 3/02* (2006.01)
*F16K 31/42* (2006.01)

(52) U.S. Cl.
CPC ....... *G05D 16/2013* (2013.01); *F16K 3/0254* (2013.01); *F16K 31/1223* (2013.01); *F16K 31/42* (2013.01)

(58) Field of Classification Search
CPC .......... E03B 7/04; E03B 1/04; F16K 31/1221; F16K 31/1223; F16K 3/0254; F16K 31/42; G05D 7/0126; G05D 7/0146; G05D 16/10; G05D 16/103; G05D 16/2013
See application file for complete search history.

(56) References Cited

U.S. PATENT DOCUMENTS 585,377 A * 6/1897 Craig .................... F16K 31/363
  251/26
2,626,633 A * 1/1953 Wilson ................ F16K 31/1221
  137/601.13

FOREIGN PATENT DOCUMENTS

CA 2823110 A1 * 7/2012 ......... F16K 37/0016

* cited by examiner

*Primary Examiner* — Umashankar Venkatesan
(74) *Attorney, Agent, or Firm* — Harness, Dickey & Pierce, P.L.C.

(57) ABSTRACT

A safety device for hydrodynamic pressure regulating pipe network includes a gate valve, which comprises at least a valve body and a gate. A water inlet of the gate valve is used to be connected to a water inlet pipeline. A hydraulic driving device, which comprises a hydraulic cylinder, is also included. The hydraulic cylinder includes a cylinder body, a piston and a piston rod. The piston rod is connected to the gate. The lower part of the inner cavity of the cylinder body is connected to the water inlet pipeline through a gate opening power pipelines. The upper part of the inner cavity of the cylinder body is connected to a gate closing driving device, which is used to drive the gate and close the gate valve.

10 Claims, 4 Drawing Sheets

SAFETY DEVICE FOR HYDRODYNAMIC PRESSURE REGULATING PIPE NETWORK

CROSS-REFERENCE TO RELATED APPLICATION

This application claims the benefit and priority of Chinese Application No. 202010361386.4, filed Apr. 30, 2020. The entire disclosure of the above application is incorporated herein by reference.

FIELD

The present disclosure relates to a secondary water supply device, in particular to a safety device for hydrodynamic pressure regulating pipe network.

BACKGROUND

According to Article 21 of the National Urban Water Supply Regulations: "It is forbidden to directly install pumps to pump water on the urban public water supply pipeline."

The technical regulations for secondary water supply project of the Ministry of Housing and Urban-Rural Development CJ140-2010 also require that: "Secondary water supply shall not affect the normal water supply of the urban water supply pipe network"; "Secondary water supply facility shall have operational safety precautions."

The above regulations indicate that the water supply pipe network system is not allowed to be directly connected between the urban secondary water supply facility and the water supply pipe network, and the pipe network safety adjusting device must be connected in series between the water supply pipe network and the secondary water supply device, so that the water supply pipe network does not produce negative pressure when the secondary water supply facility is subjected to pressure-superposed water supply, and the normal water supply of the water supply pipe network is guaranteed.

The non-negative pressure control technology used in the existing pipe network safety regulating device is applied after a large number of practice, and has the following disadvantages:

When the installation elevation of the water supply device unit is lower than the installation elevation of the water supply pipe network, it is as shown in FIG. 4. In the figure, 201 a steady flow tank, 202 a vacuum suppressor, 203 a pressure sensor, 204 a check valve, 205 a water pump, 206 a valve, 207 a pressure sensor, 208 a pressure gauge, 209 a filter, 210 an anti-backflow device, 211 a control cabinet are provided.

1. The method of using a steady flow tank plus a vacuum suppressor as a pipe network safety adjusting device cannot achieve the pipe network protection function. The specific reasons are set forth below.

A water level difference is formed between the central elevation of the water supply pipe network and the installation elevation of the water pump unit. When the water level difference acts on the vacuum suppressor, it will produce a water seal effect on the vacuum suppressor so that the vacuum suppressor loses the air discharging function; when the water supply flow pressure of the water supply pipe network is less than the actual water supply demand, the gravity flow generated depending on the elevation difference will cut off the pipe section of the water supply pipe network and form a negative pressure in the pipe network, which seriously affects the safe water supply of the water supply pipe network.

Due to the relationship of elevation difference, the horizontal inlet pressure of the steady flow tank under this condition does not represent the actual pressure of the pipe network, and it is an illusion. Moreover, because the vacuum suppressor is sealed by water, the vacuum suppressor detection system cannot detect and process it at all.

The steady flow tank plus a vacuum suppressor is used as the pipe network protection device, and its protection range only comprises the flow changing protection device. That is, when the water supply pipe network does not meet the water supply amount of the unit, a negative pressure will be generated in the steady flow tank. The vacuum suppressor destroys the negative pressure that has been formed in the steady flow tank by the external atmospheric pressure to prevent the negative pressure from being formed in the water supply pipe network. The pressure protection of the water supply pipe network presets the water inlet pressure value of the water supply pipe network, and the pressure sensor detects the monitoring system to control the water inlet pressure, so as to ensure that the water supply pipe network does not form a low pressure area.

Thus, the non-negative pressure protection function of the steady flow tank plus the vacuum suppressor and the set pressure value protection function of the water supply pipe network of the monitoring system detected by the pressure sensor are analyzed. In actual operation, the preset pressure value protection function of the water supply pipe network is adopted. The downtime range is the lower limit of the set pressure. In this case, the pipe network protection pump stopping range is the lower limit of the pressure, which does not represent that there is no water in the pipe network. Therefore, an initiative anti-low pressure area control technology is artificially set for transmitting electrical signals, and the pipe network protection pump stopping range of the traditional non-negative pressure protection function is that the pipe network pressure is less than or equal to the atmospheric pressure value. To be clear, the amount of incoming water from the water supply pipe network cannot meet the requirements of water consumption, and it is a passive non-negative pressure control technology. The above two functions cannot be taken into account at the same time.

In the existing secondary water supply process, the pressure set value of the water supply pipe network is used to protect the safe water supply of the water supply pipe network. It is indeed effective to prevent the water supply low-pressure area or the negative pressure of the pipe network. However, since there is signal interference in the mechatronic control device, the failure rate is high, and it is in the low-pressure area of the water supply pressure. For local interests, the set value of the water supply pressure is artificially adjusted, so that the water supply pipe network generates a water supply low-pressure area and a negative pressure in a large area. Therefore, in domestic large cities such as Shanghai, the energy-saving pressure-superposed water supply method is abandoned and the high-level water tank water supply method is adopted.

SUMMARY

In view of the above defects of the prior art, the object of the present disclosure is to provide a safety device for hydrodynamic pressure regulating pipe network, so as to solve the above problems in the prior art.

In order to achieve the above object and other related objects, the present disclosure provides a safety device for hydrodynamic pressure regulating pipe network, comprising:

a gate valve, which comprises at least a valve body and a gate; wherein a water inlet of the gate valve is used to be connected to a water inlet pipeline;

cylinder comprises a cylinder body, a piston and a piston rod; the piston rod is connected to the gate; the lower part of the inner cavity of the cylinder body is connected to the water inlet pipeline through a gate opening power pipeline; and the upper part of the inner cavity of the cylinder body is connected to a gate closing driving device, which is used to drive the gate and close the gate valve.

Preferably, the gate closing driving device comprises an energy storage air pressure tank, an air outlet of the energy storage air pressure tank is communicated with the upper part of the inner cavity of the hydraulic cylinder body through a gate closing air supply pipeline; the energy storage air pressure tank is provided with a pressure compensation adjusting pipeline, and a pressure gauge and a control valve are provided on the pressure compensation adjusting pipeline.

Preferably, a control valve, a filter, and a pressure gauge are provided on the gate opening power pipeline.

Preferably, a control valve and a pressure gauge are provided on the gate closing air supply pipeline.

Preferably, a pressure release adjusting pipeline is provided on the energy storage air pressure tank, and a pressure release adjusting valve is provided on the pressure release adjusting pipeline.

Preferably, the gate closing driving device comprises a gate closing driving spring, and the gate closing driving spring is provided in the upper part of the inner cavity of the cylinder body.

Preferably, a contact is fixedly provided on the piston rod, a potentiometer is fixedly provided on the inner wall of the valve body; the contact is abutted against the potentiometer; and the potentiometer is used to be connected to a control system.

When in use, according to different needs, 1) the pipe network safety device is connected in series between the backbone network of the municipal water supply pipe network and the branch water supply pipe network, which is used to realize the optimal dispatch of the water supply pressure of the municipal water supply pipe network; 2) the pipe network safety device is connected in series between the municipal water supply and various water supply units for energy-saving pressure-superposed water supply and municipal pipe network safety protection.

1. When the water supply pressure of the water supply pipe network reaches a set value, the incoming water pressure of the water supply pipe network enters the lower part of the inner cavity of the hydraulic cylinder through the gate opening power pipeline, and the incoming water pressure is converted into the gate opening force and acts on the piston. The opening force pushes the piston and drives the gate to move upwards gradually and smoothly, and opens the valve. At this time, the air in the upper part of the inner cavity of the hydraulic cylinder body or the gate closing driving spring is compressed, which is converted into pressure energy or mechanical energy, and stores energy for closing the valve. The function is realized that the pressure protection range is set according to the pipe network and the water absorption of the water pump unit does not affect the pressure safety of the municipal water supply pipe network.

2. When the water supply pressure of the water supply pipe network does not reach the set value, the closing force of the gate formed by the internal pressure of the energy storage air pressure tank plus the gravity of the gate or the spring pressure plus the gravity of the gate is greater than the opening force formed by the incoming water pressure of the water supply pipe network. The closing force pushes the piston and drives the gate to close gradually and smoothly. The function is realized that when the water supply pressure of the municipal pipe network does not meet the pressure set value, the valve is closed in time and the water pump unit is shut down, which does not affect the pressure safety of the municipal water supply pipe network.

3. During the valve opening process, the resistance caused by the compression of the air or spring gradually increases. Within the upper and lower limits of the set opening pressure of the pipe network, its opening degree changes with the change of the water supply pressure of the municipal pipe network. The function is realized that the water supply flow is automatically adjusted according to the water supply pressure change of the municipal pipe network to realize flow adjustment and continuous water supply.

Using the safety device for hydrodynamic pressure regulating pipe network, various forms of combined pressure-superposed water supply secondary water supply devices and municipal pipe network safety water supply control systems have the following characteristics.

1. The safety protection function of the pipe network is not affected by the installation elevation difference between the water supply device unit and the water supply pipe network.

When in use, the opening pressure value of the safety device of the pipe network is set according to the sum of the allowable pressure value when the water supply pipe network and the water supply device have no elevation difference and the elevation difference pressure value between the water supply device and the water supply pipe network. This value is the allowable pressure value of the water supply network.

For example, when there is no elevation difference, the allowable pressure value of the water supply pipe network is 0.1 MPa, and when the elevation difference is 6 meters, the allowable pressure value of the water supply pipe network with elevation difference is 0.1 MPa+0.06 MPa=0.16 MPa.

The dynamic pressure regulating tank-type pressure-superposed water supply device prevents the water pump of the water supply pipe network from directly taking water from the water supply pipe network when the water supply pressure is lower than the set value due to being installed with a safety device for hydrodynamic pressure regulating pipe network, so that the water supply pipe network generates vacuum and a low pressure area. Especially when the installation elevation of the water supply unit is lower than the installation elevation of the water supply pipe network (the water supply device is installed in the basement), the elevation difference forms a water seal state on the water pump unit non-negative pressure protection system. When the water supply pressure of the water supply pipe network is lower than the set value, the incoming water from the water supply pipe network enters the water inlet of the water pump in a manner of gravity flow in the case that there is no diversion valve.

2. Because the opening and closing power of the pipe network safety device is only controlled by the pressure of the water supply pipe network and the gate closing driving device, it is not affected by external factors or controlled by mechatronics. In addition, the opening and closing pressure of the gate of the pipe network safety device is an allowable set value, and the pressure set range of the pressure set value is adjustable. The function is realized that the pipe network has initiative in the case of various incoming water pressure changes and the municipal pipe network water supply is prevented from generating a low-pressure area.

3. In view of the special structure of the device, the power required for opening the device during power conversion does not consume the pressure of the incoming water of the water supply pipe network, so that when the pressure of the water supply pipe network reaches the set upper limit of the pressure, the gate is fully opened, and the water inlet and outlet pressure valves in front of and behind the valve are equivalent to fully realize the function that pressure of the water supply pipe network performs energy-saving pressure-superposed water supply.

4. In view of the opening and closing range of the valve, within the upper and lower limits of the set pressure of the pipe network, its opening degree changes with the change of the water supply pressure of the municipal pipe network. The function is realized that the water supply flow is automatically adjusted according to the water supply pressure change of the municipal pipe network to realize flow adjustment and continuous water supply.

5. This device has the functions of two sets of devices of a vacuum suppressor plus flow stabilizer pipe network non-negative pressure control technology in the prior art and a municipal pipe network pressure setting control technology, and its initiative safety protection factor and structure, maintenance, management and other aspects are superior to existing technologies in the prior art.

6. The range of application is wide.

1) The pipe network safety device can form a series of secondary water supply devices with multiple functions;

2) The function of the pipe network safety device is not limited by the fact that the installation elevation of the unit is lower than the elevation of the municipal pipe network;

3) The pipe network safety device is connected in series between the backbone network of the municipal water supply pipe network and the branch pipe network or the water supply area, which can realize the optimal dispatch of the pressure of the municipal water supply pipe network;

4) The pipe network safety device is installed on the existing device with hidden dangers in the safety protection measures of the water supply pipe network, which can strengthen and ensure the safety protection measures of the water supply pipe network, and is convenient to install, safe and reliable in operation, and unrelated to various controls of the existing device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the figures: 1 a water inlet pipeline, 2 a control valve, 3 a gate opening power pipeline, 4 a filter, 5 a pressure gauge, 6 a piston, 7 an energy storage air pressure tank, 8 a cylinder body, 9 a piston rod, 10 a valve body, 11 a gate, 12 a gate closing air supply pipeline, 13 a control valve, 14 a pressure gauge, 15 a pressure gauge, 16 a pressure compensation adjusting pipeline, 17 a control valve, 18 a pressure release adjusting pipeline, 19 a water inlet pipeline, 20 a gate closing driving spring, 21 a pressure release adjusting valve, 22 a contact, 23 a potentiometer; 201 a steady flow tank, 202 a vacuum suppressor, 203 a pressure sensor, 204 a check valve, 205 a water pump, 206 a valve, 207 a pressure sensor, 208 a pressure gauge, 209 a filter, 210 an anti-backflow device, 211 a control cabinet.

DETAILED DESCRIPTION

The examples of the present disclosure are described through specific examples, and those skilled in the art can easily understand other advantages and effects of the present disclosure from the contents disclosed in this specification. The present disclosure can also be implemented or applied through different specific examples. Various modifications or changes can also be made to the details in this specification based on different viewpoints and applications without departing from the spirit of the present disclosure. It should be noted that the following examples and the features in the examples can be combined with each other without conflict.

It should be noted that the illustrations provided in the following examples only illustrate the basic concept of the present disclosure in a schematic manner. Therefore, the drawings only show the components related to the present disclosure, which are not drawn according to the number, shape and size of the components during actual implementation. The type, number and ratio of each component can be changed at will during its actual implementation, and the layout type of the component may also be more complicated.

Figure 1:
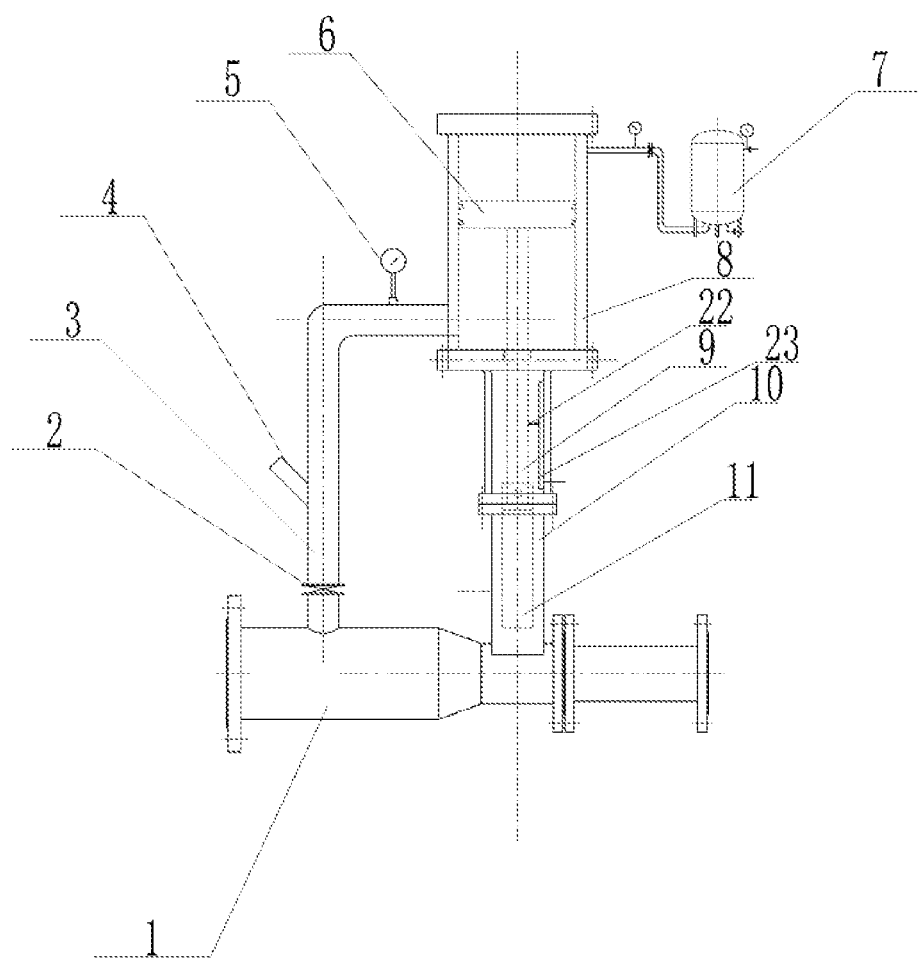
FIG. 1 is a schematic structural diagram of Example 1 of a safety device for hydrodynamic pressure regulating pipe network according to the present disclosure.
Figure 2:
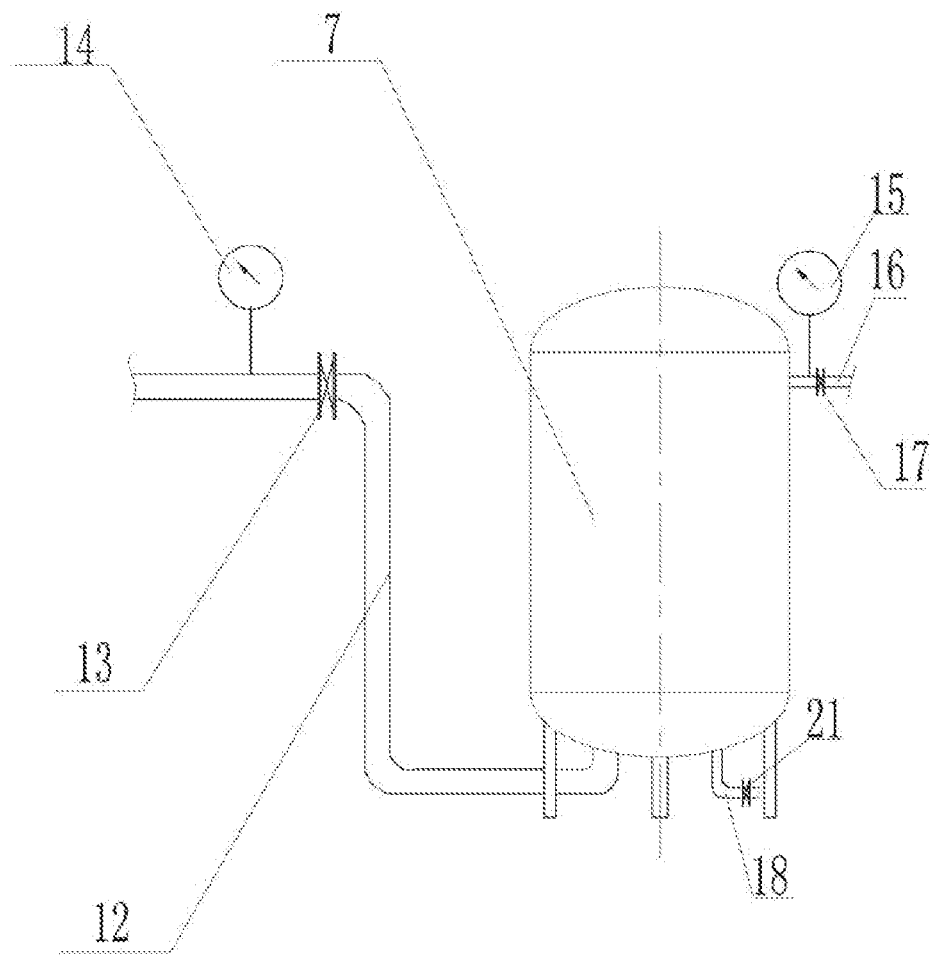
FIG. 2 is a partially enlarged diagram of the schematic structural diagram of Example 1 of a safety device for hydrodynamic pressure regulating pipe network according to the present disclosure.

Example 1: refer to FIG. 1 and FIG. 2; one aspect of the present disclosure is to provide a safety device for hydrodynamic pressure regulating pipe network, comprising: a gate valve, which comprises at least a valve body 10 and a gate 11; wherein a water inlet of the gate valve is used to be connected to a water inlet pipeline 1; a hydraulic driving device, which comprises a hydraulic cylinder, wherein the hydraulic cylinder comprises a cylinder body 8, a piston 6 and a piston rod 9; the piston rod 9 is connected to the gate 11; the lower part of the inner cavity of the cylinder body 8 is connected to the water inlet pipeline 1 through a gate opening power pipeline 3; and the upper part of the inner cavity of the cylinder body 5 is connected to a gate closing driving device, which is used to drive the gate 11 and close the gate valve.

In another example, the gate closing driving device comprises an energy storage air pressure tank 7, an air outlet of the energy storage air pressure tank 7 is communicated with the upper part of the inner cavity of the hydraulic cylinder body 8 through a gate closing air supply pipeline 12; the energy storage air pressure tank 7 is provided with a pressure compensation adjusting pipeline 16, and a pressure gauge 15 and a control valve 17 are provided on the pressure compensation adjusting pipeline 16.

In another example, a control valve 2, a filter 4, and a pressure gauge 5 are provided on the gate opening power pipeline 3.

In another example, a control valve 13 and a pressure gauge 14 are provided on the gate closing air supply pipeline 12.

In another example, a pressure release adjusting pipeline 18 is provided on the energy storage air pressure tank 7, and a pressure release adjusting valve 21 is provided on the pressure release adjusting pipeline.

In another example, a contact 22 is fixedly provided on the piston rod 9, a potentiometer 23 is fixedly provided on the inner wall of the valve body 10; the contact 22 is abutted against the potentiometer 23; and the potentiometer 23 is used to be connected to a control system.

Figure 3:
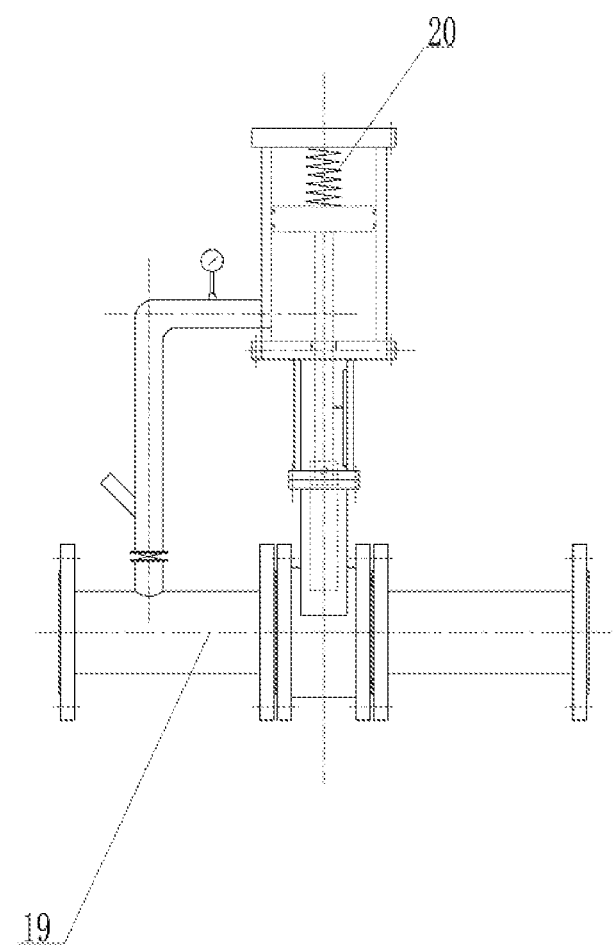
FIG. 3 is a schematic structural diagram of Example 2 of a safety device for hydrodynamic pressure regulating pipe network according to the present disclosure.

Example 2: refer to FIG. 3; the difference between example 2 and example 1 is that the gate closing driving device is different. The gate closing driving device in example 2 comprises a gate closing driving spring 20, and the gate closing driving spring 20 is provided in the upper part of the inner cavity of the cylinder body. At the same time, the water inlet pipeline 19 is connected to the water inlet of the gate valve by a flange.

Figure 4:
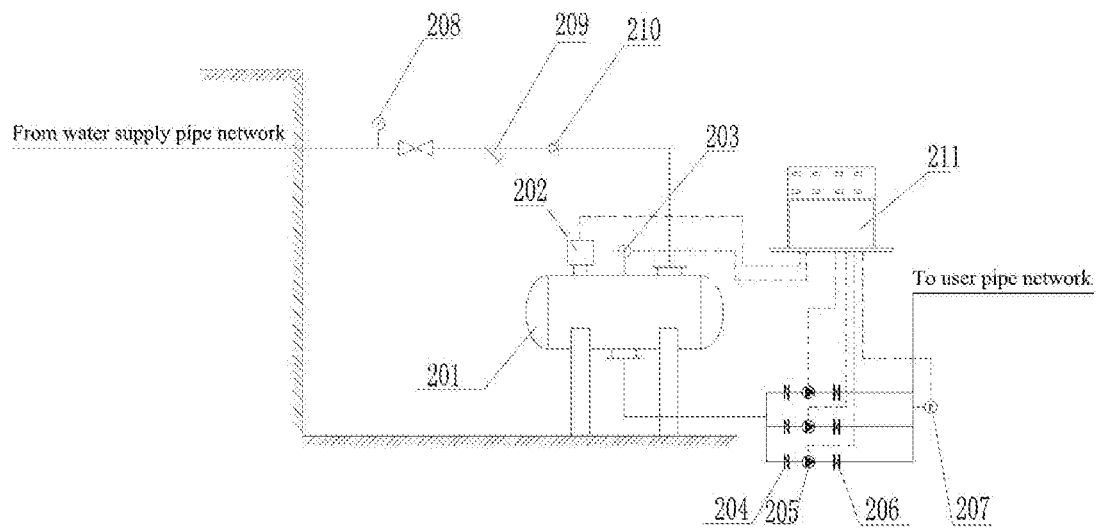
FIG. 4 is a schematic structural diagram of a tank water supply device in the prior art.

FIG. 4 is a schematic structural diagram of a tank water supply device in the prior art; in the figure, 201 a steady flow tank, 202 a vacuum suppressor, 203 a pressure sensor, 204 a check valve, 205 a water pump, 206 a valve, 207 a pressure sensor, 208 a pressure gauge, 209 a filter, 210 an anti-backflow device, 211 a control cabinet are provided.

The above examples only exemplarily illustrate the principle and effect of the present disclosure, and are not intended to limit the present disclosure. Those skilled in the art can modify or change the above examples without departing from the spirit and scope of the present disclosure. Therefore, all equivalent modifications or changes made by those with ordinary knowledge in the technical field without departing from the spirit and technical idea disclosed by the present disclosure should still be covered by the claims of the present disclosure.

What is claimed is:

1. A safety device for a hydrodynamic pressure regulating pipe network, comprising:
    a gate valve, which comprises at least a valve body and a gate; wherein a water inlet of the gate valve is configured to be connected to a water inlet pipeline;
    a hydraulic driving device, which comprises a hydraulic cylinder, wherein the hydraulic cylinder comprises a cylinder body, a piston and a piston rod; the piston rod is connected to the gate; a lower part of an inner cavity of the cylinder body is connected to the water inlet pipeline through a gate opening power pipeline; and an upper part of the inner cavity of the cylinder body is connected to a gate closing driving device, which is configured to drive the gate and close the gate valve;
    wherein the gate closing driving device comprises an energy storage air pressure tank, an air outlet of the energy storage air pressure tank is in communication with the upper part of the inner cavity of the cylinder body through a gate closing air supply pipeline; the energy storage air pressure tank comprises a pressure compensation adjusting pipeline, and a first pressure gauge and a first control valve are provided on the pressure compensation adjusting pipeline.

2. The safety device for the hydrodynamic pressure regulating pipe network according to claim 1, wherein a contact is fixedly provided on the piston rod, a potentiometer is fixedly provided on an inner wall of the valve body; the contact is abutted against the potentiometer; and the potentiometer is connected to a control system.

3. The safety device for the hydrodynamic pressure regulating pipe network according to claim 1, wherein: a second control valve and a second pressure gauge are provided on the gate closing air supply pipeline.

4. The safety device for the hydrodynamic pressure regulating pipe network according to claim 3, wherein a contact is fixedly provided on the piston rod, a potentiometer is fixedly provided on an inner wall of the valve body; the contact is abutted against the potentiometer; and the potentiometer is connected to a control system.

5. The safety device for the hydrodynamic pressure regulating pipe network according to claim 1, wherein: a pressure release adjusting pipeline is provided on the energy storage air pressure tank, and a pressure release adjusting valve is provided on the pressure release adjusting pipeline.

6. The safety device for the hydrodynamic pressure regulating pipe network according to claim 5, wherein a contact is fixedly provided on the piston rod, a potentiometer is fixedly provided on an inner wall of the valve body; the contact is abutted against the potentiometer; and the potentiometer is connected to a control system.

7. The safety device for the hydrodynamic pressure regulating pipe network according to claim 1, wherein: a third control valve, a filter, and a third pressure gauge are provided on the gate opening power pipeline.

8. The safety device for the hydrodynamic pressure regulating pipe network according to claim 7, wherein a contact is fixedly provided on the piston rod, a potentiometer is fixedly provided on an inner wall of the valve body; the contact is abutted against the potentiometer; and the potentiometer is connected to a control system.

9. The safety device for the hydrodynamic pressure regulating pipe network according to claim 1, wherein: the gate closing driving device comprises a gate closing driving spring, and the gate closing driving spring is provided in the upper part of the inner cavity of the cylinder body.

10. The safety device for the hydrodynamic pressure regulating pipe network according to claim 9, wherein a contact is fixedly provided on the piston rod, a potentiometer is fixedly provided on an inner wall of the valve body; the contact is abutted against the potentiometer; and the potentiometer is connected to a control system.

* * * * *